(12) United States Patent
Schrock et al.

(10) Patent No.: US 8,260,798 B2
(45) Date of Patent: Sep. 4, 2012

(54) METHOD AND SYSTEM FOR PARTIAL SHADOW MIGRATION

(75) Inventors: Eric Noah Schrock, Medford, MA (US); Adam H. Leventhal, San Francisco, CA (US)

(73) Assignee: Oracle International Corporation, Redwood City, CA (US)

( * ) Notice: Subject to any disclaimer, the term of this patent is extended or adjusted under 35 U.S.C. 154(b) by 171 days.

(21) Appl. No.: 12/820,723

(22) Filed: Jun. 22, 2010

(65) Prior Publication Data

US 2011/0313976 A1 Dec. 22, 2011

(51) Int. Cl.
*G06F 7/00* (2006.01)
(52) U.S. Cl. ........................................ 707/758
(58) Field of Classification Search .............. 707/758, 707/822
See application file for complete search history.

(56) References Cited

U.S. PATENT DOCUMENTS 6,938,039 B1 * 8/2005 Bober et al. .................. 707/704

* cited by examiner

*Primary Examiner* — Truong Vo
(74) *Attorney, Agent, or Firm* — Osha Liang LLP

(57) ABSTRACT

A method for migrating files including receiving, from a client, a first FS operation request for a target FS, making a first determination that migration for a source FS is not complete and making a second determination that the first FS operation request specifies a directory and that a directory level attribute for the directory on the target FS specifies that the directory on the target FS is un-migrated. In response to the first and second determination obtaining, from the source FS, meta-data for content in the directory and creating, using the meta-data, a directory entry for a file in the directory on the target FS. The method further includes creating an on-disk space map for the file, creating an in-memory space map for the file, and servicing, after creating the on-disk space map and in-memory space map, the first FS operation request using the target FS.

16 Claims, 13 Drawing Sheets

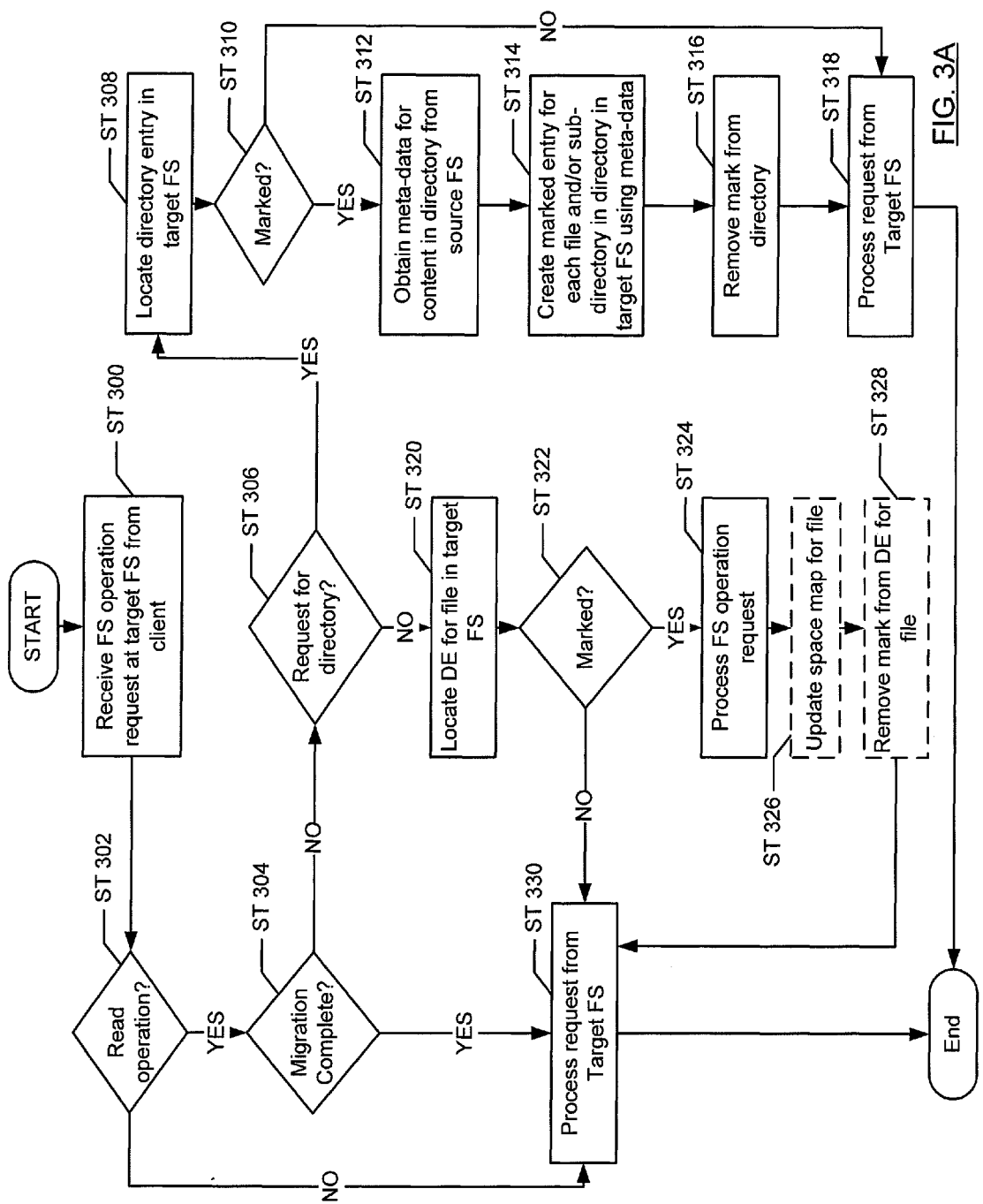

METHOD AND SYSTEM FOR PARTIAL SHADOW MIGRATION

BACKGROUND

A typical operating system includes a file system. The file system provides a mechanism for the storage and retrieval of files and a hierarchical directory structure for the naming of multiple files. More specifically, the file system stores information (i.e., data) provided by the client (i.e., a local or remote process) and information describing the characteristics of the data (i.e., meta-data). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk. To access a file, the operating system (via the file system) typically provides file manipulation interfaces to open, close, read, and write the data within each file.

In some instances, the files need to be migrated from the current file system to a new file system. In such instances, the data (and meta-data) currently stored in the current file system must be moved to a new file system. Such a migration is typically achieved by initially taking the current file system offline (i.e., preventing clients from reading or writing to the current file system). Once offline, various techniques may be used to transfer each directory and file in the current file system to the new file system. Depending on the amount of data in the current file system, the migration may take a significant period of time, during which the data in the current file system and the new file system are inaccessible to the clients.

SUMMARY

In general, in one aspect, the invention relates to a computer readable storage medium comprising software instructions, which when executed by a processor, perform a method, the method comprising receiving, from a client, a first file system (FS) operation request for a target FS, making a first determination that migration for a source FS is not complete, making a second determination that the first FS operation request specifies a directory and that a directory level attribute for the directory on the target FS specifies that the directory on the target FS is un-migrated, in response to the first and second determination: obtaining, from the source FS, meta-data for content in the directory, creating, using the meta-data for content in the directory, a directory entry for a file in the directory on the target FS, wherein the directory entry for the file is associated with a file level attribute that specifies the file is un-migrated, creating an on-disk space map for the file, creating an in-memory space map for the file, and servicing, after creating the on-disk space map and the in-memory space map, the first FS operation request using the target FS.

In general, in one aspect, the invention relates to a computer system, comprising a processor, and a virtual file system layer (VFS) operatively connected to a source file system (FS) and a target FS. When the VFS is executed by the processor, the VFS performs a method, the method comprising: receiving, from a client, a first file system (FS) operation request for a target FS, making a first determination that migration for a source FS is not complete, making a second determination that the first FS operation request specifies a directory and that a directory level attribute for the directory on the target FS specifies that the directory on the target FS is un-migrated, in response to the first and second determination: obtaining, from the source FS, meta-data for content in the directory, creating, using the meta-data for content in the directory, a directory entry for a file in the directory on the target FS, wherein the directory entry for the file is associated with a file level attribute that specifies the file is un-migrated, creating an on-disk space map for the file, creating an in-memory space map for the file, servicing, after creating the on-disk space map and the in-memory space map, the first FS operation request using the target FS.

Other aspects of the invention will be apparent from the following description and the appended claims.

BRIEF DESCRIPTION OF DRAWINGS

FIGS. 3A and 3B shows in accordance with one embodiment of the invention.

DETAILED DESCRIPTION

Figure 1:
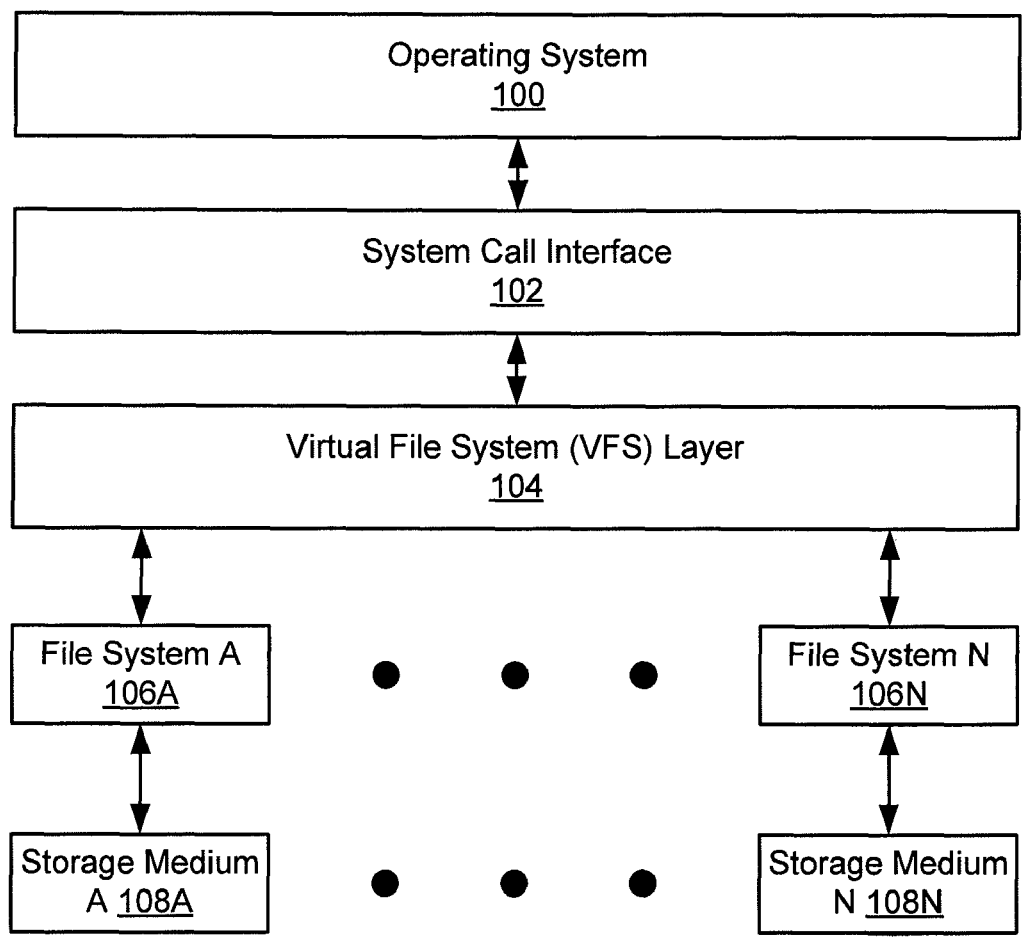
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details.

In general, the invention relates to migration of files and directories from a source file system to a target file system. More specifically, the invention enables file system migration while allowing clients to continue to access the files and directories during the migration. Further, embodiments of the invention relate partial migration of files from the source file system to the target file system. In one embodiment of the invention, the portions of the file transferred to the target file system are tracked using space maps.

For purposes of this invention, each file system represents directories, sub-directories, and files as directory entries. Each directory entry includes the name of the corresponding entity, i.e., directory, sub-directory, or file, and is associated with the corresponding meta-data and data (if applicable). Accordingly, all references (unless otherwise specified) to directories, sub-directories, and files are intended to include the corresponding directory entry, meta-data, and data (if applicable).

FIG. 1 shows a system in accordance with one embodiment of the invention. The system includes an operating system (100), a system call interface (102), a virtual file system (VFS) (104), a number of file systems (106A, 106N), and a number of storage mediums (108A, 108N). Each of these components is described below.

In one embodiment of the invention, the operating system (100) is configured to interface with clients (not shown) and with the file systems (106A, 106N) via the system call interface (102) and the VFS layer (104). In one embodiment of the invention, a client is any remote or local process (including operating system processes) that includes functionality to issue a file system (FS) operation request. In one embodiment of the invention, FS operation requests include, but are not limited to, read( ), write( ), open( ), close( ), mkdir( ), rmdir( ), rename( ), sync( ), unmount( ), and mount( ). Examples of operating systems (100) include, but are not limited to, MAC OS®, Solaris™, Linux, Microsoft® Windows®. (MAC OS is a registered trademark of Apple, Inc; Microsoft and Windows are registered trademarks of the Microsoft Corporation; Solaris is a trademark of Sun Microsystems, Inc; Linux is a registered trademark on Linus Torvalds.)

In one embodiment of the invention, the system call interface (102) is configured to receive FS operation requests from the operating system (100), forward the FS operation requests to the VFS layer (104), receive responses to the FS operation requests, and forward to the corresponding responses to the operating system. Those skilled in the art will appreciate that while the system call interface (102) is represented as a distinct component from the operating system (100), the system call interface (102) may be located within the operating system (100).

In one embodiment of the invention, the VFS layer (104) is an abstraction layer interposed between file systems (106A, 106N) and the operating system. In one embodiment of the invention, the purpose of the VFS layer (104) is to allow the operating system (100) to access different types of file systems (106A, 106N) in a uniform way. For example, the VFS layer (104) may be used to access local and networked file systems transparently without the operating system (100) being aware of the difference. Further, the VFS layer (104) enables the operating system (100) to access different file systems (e.g., ZFS, Network File System (NFS), Unix File System (UFS), New Technology File System (NTFS), Hierarchical File System (HFS), etc.) without requiring the operating system (100) to be aware of the type of file system it is accessing.

In one embodiment of the invention, each file system (106A, 106N) includes a method for storing and organizing files (including the corresponding file meta-data and file data). Further, each file system (106A, 106N) may include functionality to associate meta-data with directories. The meta-data (associated with directories and files) may include regular attributes and extended attributes.

In one embodiment of the invention, regular attributes are defined and interpreted by the file system, examples of meta-data stored in regular attributes may include but are not limited to access permissions for the file or directory, date/time file was created and/or modified. In one embodiment of the invention, extended attributes may be used to associate meta-data with files and/or directories; however, the meta-data stored in the extended attributes is not defined or interpreted by the file system. In one embodiment of the invention, the root of a target file system (FS) (discussed below), directories in the target FS, and files in the target FS each include at least one extended attribute used to indicate whether the root, directory or file has been migrated. In one embodiment of the invention, the extended attributes are interpreted by the VFS layer (104).

In one embodiment of the invention, each file system (106A, 106N) is configured to store meta-data and data on one or more storage medium (108A, 108N). Each storage medium (108A, 108N) corresponds to a physical storage device configured to store data and meta-data. Examples of the storage mediums (108A, 108N) include, but are not limited to, magnetic media (e.g., disk drives, tape drives), solid-state drives (e.g., NAND flash devices, NOR flash devices), optical media (e.g., compact disks (CDs), digital versatile disks (DVDs), Blu-ray® Disks, etc.), or any combination thereof (Blu-ray is a trademark of the Blu-ray Disk Association).

Those skilled in the art will appreciate that while FIG. 1 shows each file system (106A, 106N) associated with a single storage medium (108A, 108N), a single file system may be associated with multiple storage media and/or a given storage medium may concurrently support multiple file systems.

In on embodiment of the invention, one or more file systems are associated with an on-disk space map(s) (not shown). In one embodiment of the invention, the on-disk is located in persistent memory (e.g., on a persistent storage medium). Those skilled in the art will appreciate that the on-disk space map may be located in any location within (or accessible to) the target FS.

In one embodiment of the invention, the computer system (s) upon which the operating system includes volatile memory (e.g., in Random Access Memory or any other non-persistent memory). Further, volatile memory is configured to store an in-memory space map.

In one embodiment of the invention, a space map (on-disk or in-memory) is a data structure that is used to track which portions of a given file have been transferred to the target FS. In one embodiment of the invention, the space map is implemented on a per-file basis as a log of transactions on the file. In one embodiment of the invention, each time a portion of the file is copied to the target FS from the source FS, the corresponding space map may record which portion of the file was copied. The following is a non-limiting example of space map for a file being copied to the target FS.

In this example, the space map starts with the total range of the file on the source FS that has not been transferred to the target FS (denoted as "Remote Range"), as portions are copied to the target FS from the source FS or new data is written to the file on the target FS, the space map includes these entries (denoted as "Local Range").

Initial Space Map:
[Remote Range, 0, 100]
Space Map After Read Operation for range 30-50 of the file:
[Remote Range, 0, 100]
[Local Range, 30, 50]
Space Map After Write Operation for range 50-80 of the file:
[Remote Range, 0, 100]
[Local Range, 30, 50]
[Local Range, 50, 80]

Over time, the space map may be compressed, in order to occupy less space. In such cases, the [Remote Range] may be combined with the local ranges to obtain one or more Remote Ranges (denotes collectively, as "an updated remote range"). Continuing with the above example, the space map, after compression may be represented as follows:
Space Map After Compression:
[Remote Range, 0, 30]
[Remote Range, 80, 100]

In one embodiment of the invention, the underlying data structure(s) used to implement the space maps may include, but are not limited to, log files, an AVL tree, B-trees, Bitmaps, or any other data structure capable of maintaining which portions of the file have been copied from a source FS to a target FS (and/or show which portions of the file are present on the target FS due to, for example, write operations). Those skilled in the art will appreciate that other schemes, aside from integers, may be used to identify the various portions of the file. Further, the specific portions of the file do not need to by uniform in size.

In one embodiment of the invention, the in-memory space map and the on-disk space map for a given file may be in different states. In one embodiment of the invention, the in-memory space map for a given file is represented as one or more remote range (i.e., which portions of the file solely exist on the source FS). Further, as additional portions of the file are copied to the target FS, additional remote ranges are added or updated after the portion of the file is copied to the target FS. In contrast, the on-disk space map includes the remote range (s) as well as any local ranges, which correspond to portions of the file which were transferred to the target FS since the time the remote range initialized or last updated (i.e., compressed as discussed above).

Figure 2:
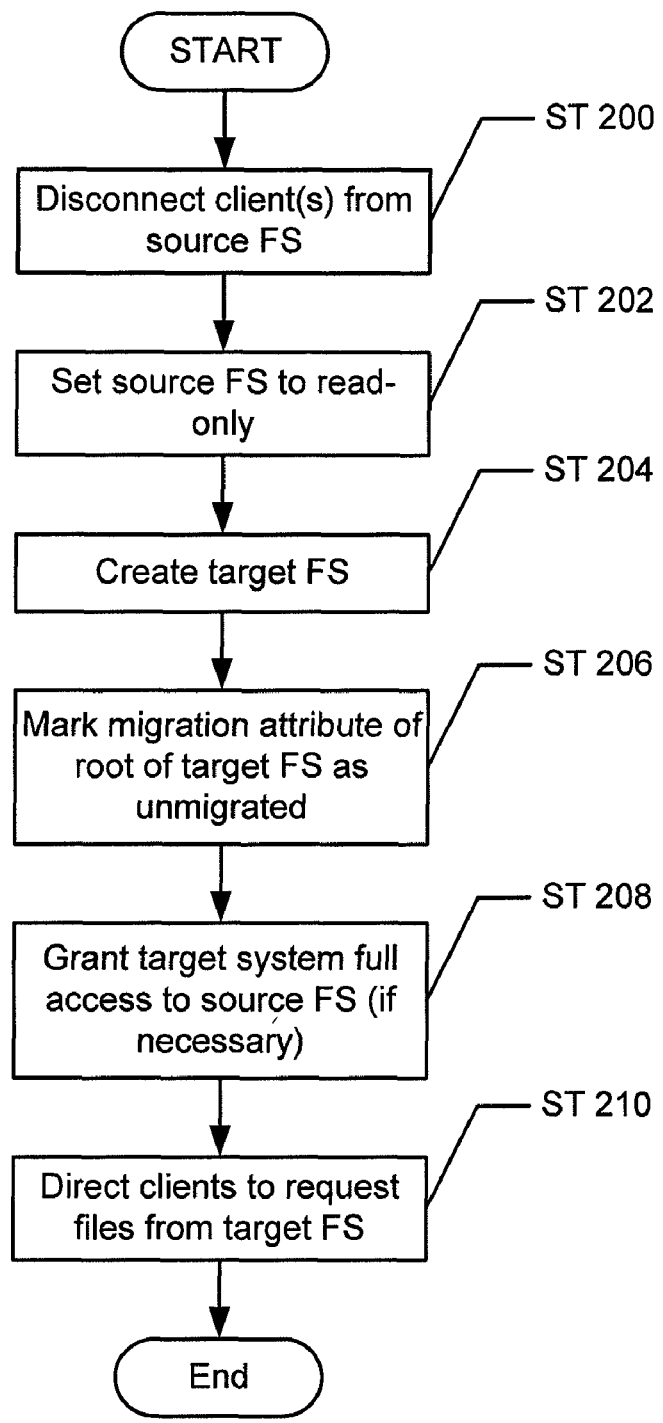
FIG. 2 shows a method in accordance with one embodiment of the invention.
Figure 3B:
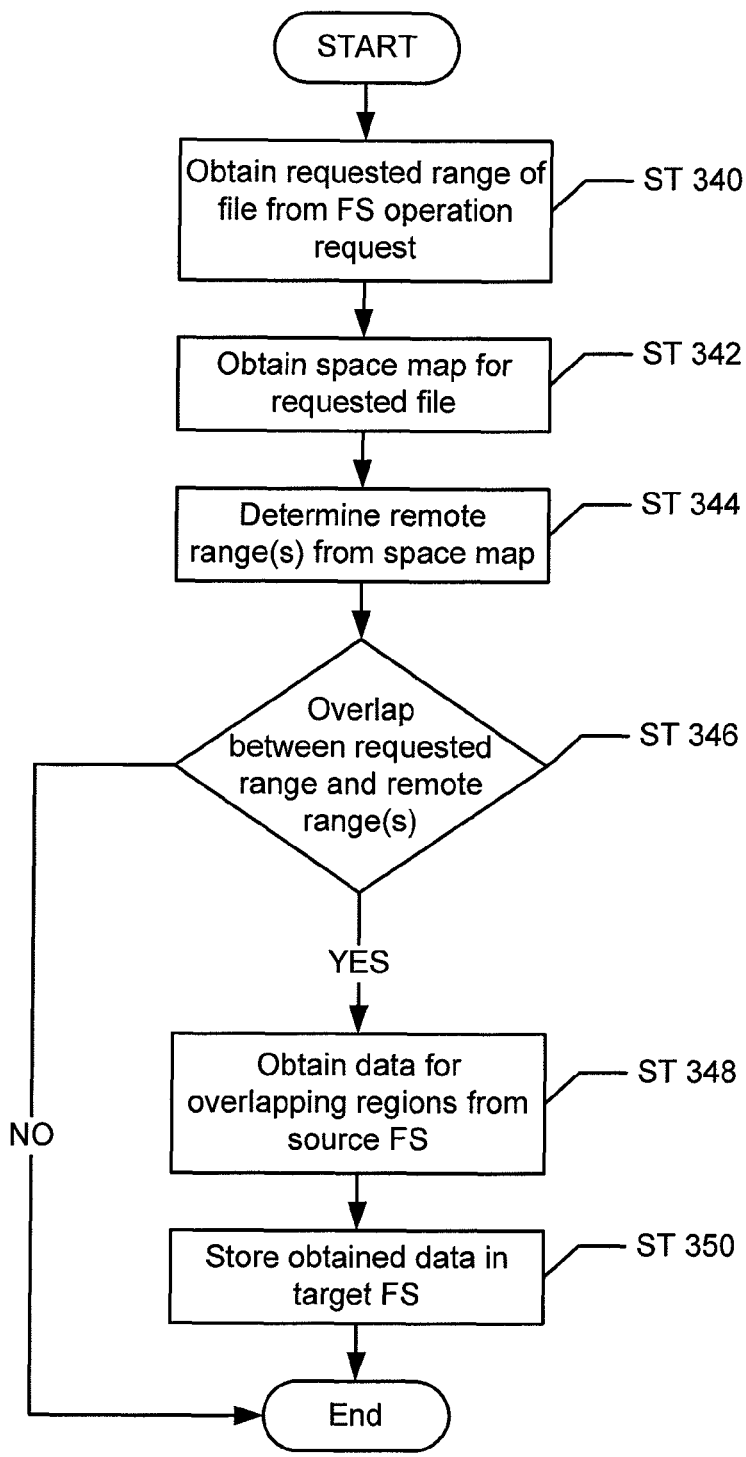

FIGS. 2 and 3A-3B show methods for migrating data and meta-data from a source FS to a target FS. More specifically, FIG. 2 shows a method for setting up a target FS prior to migrating data and meta-data from the source FS in accordance with one embodiment of the invention. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIG. 2, may be included in performing this method. Accordingly, the specific arrangement of steps shown in FIG. 2 should not be construed as limiting the scope of the invention.

In Step 200, clients are disconnected from the source FS. Those skilled in the art will appreciate that Step 200 may include both disconnecting clients currently accessing the source FS and denying new FS operation requests. In one embodiment of the invention, clients currently awaiting a response from a previously submitted FS operation request are permitted to remain connected to the source FS until the response is received, after which they are disconnected from the source FS.

In Step 202, the source FS is set to read-only. In Step 204, the target FS is created. Those skilled in the art will appreciate that creating the target FS may be performed using any known method(s). Further, once the target FS is created, the target FS may be accessed via the VFS layer. In Step 206, the migration attribute of the root of the target FS is set to "un-migrated." In one embodiment of the invention, the migration attribute is an extended attribute. In Step 208, the target system upon which the target FS is located is granted access, optionally, full access, to the source FS. Those skilled in the art will appreciate that the target system may not require full access of the source FS in order to perform the steps in FIG. 3. In such cases, the target system is not granted full access to the source FS. In Step 210, clients previously send FS operation requests to the source FS are redirected to the target FS. Further, after Step 210, new clients are also directed to issue FS operation requests to the target FS.

FIGS. 3A-3B shows in accordance with one embodiment of the invention. More specifically, FIGS. 3A-3B shows a method for migrating data and meta-data from a source FS to a target FS in accordance with one embodiment of the invention. While the various steps in this flowchart are presented and described sequentially, one of ordinary skill will appreciate that some or all of the steps may be executed in different orders, may be combined, or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 3A-3B, may be included in performing this method. Accordingly, the specific arrangement of steps shown in FIGS. 3A-3B should not be construed as limiting the scope of the invention.

In Step 300, a FS operation request is received from a client (via the VFS). In Step 302, a determination is made about whether the FS operation is a read operation. If the FS operation is a read operation, the process proceeds to Step 304. If the FS operation is not a read operation (e.g., the operation is a write operation), the process proceeds to Step 330. In one embodiment of the invention, if the FS operation request includes a partial write of file data (i.e., one portion of the file data is to be overwritten), then the corresponding directory entry (including file metadata and file data) is migrated (see, e.g., ST 324-ST328) prior to proceeding to Step 330.

In Step 304, a determination is made about whether the migration of the source FS is complete. The migration of the source FS is complete when all data and meta-data from the source FS has been copied (or otherwise transmitted) to the target FS. If the migration is not complete, the process proceeds to Step 306. If the migration is complete, the process proceeds to Step 330.

In Step 306, a determination is made about whether the FS operation request is a read request for a directory. If the FS operation request is a read request for a directory, then the process proceeds to Step 308. If the FS operation request is not a read request for a directory (i.e., the FS operation request is for a file), then the process proceeds to Step 320. In Step 308, the directory entry corresponding the requested directory in the target FS is located. In one embodiment of the invention, the directory entry includes at least meta-data associated with the directory and a migration attribute (which may be marked or unmarked, depending on whether the directory has been migrated).

In Step 310, a determination is made about whether the migration attribute in the directory entry is marked (i.e., has the directory been migrated). If the migration attribute is marked, then the directory has not been migrated and the process proceeds to Step 312. If the migration attribute is un-marked, then the directory has been migrated and the process proceeds to Step 318. In one embodiment of the invention, a directory is considered migrated when there is a corresponding directory entry for each file and sub-directory (with the associated meta-data) in the directory on the target FS for each file and sub-directory in the corresponding directory on the source FS. Those skilled in the art will appreciate that the directory entries for the files in the directory on the target FS do not need to include corresponding file data in order for the directory to be deemed as migrated.

In Step 312, the meta-data for content in the directory (e.g., file meta-data and/or sub-directory meta-data) is obtained from the source FS. In Step 314, a directory entry is created in the directory on the target FS for each file and sub-directory using the meta-data obtained in Step 312. In one embodiment of the invention, a marked directory entry corresponds to a directory entry for a file with a marked migration attribute or directory entry for a sub-directory with a marked migration attribute. Further, in one embodiment of the invention, the path to each sub-directory and/or file identified in the meta-data obtain in Step 312 is stored in an extended attribute for the corresponding directory entry. In one embodiment of the invention, an in-memory space map and a on-disk space map are created for each file identified in the meta-data obtained in Step 312. The in-memory and on-disk space maps for each file are initialized with a remote range of the file. As discussed above, the remote range (at the time of initialization) corresponds to the portions of the file that are located on the source FS but not on the target FS. Continuing with FIG. 3A, in Step 316, the migration attribute for the directory entry is unmarked. In Step 318, the FS operation request is processed using the target FS.

In Step 320, the directory entry (DE) for the file corresponding to the requested file in the target FS is located. In one embodiment of the invention, the directory entry for the file includes at least meta-data associated with the file and a migration attribute (which may be marked or unmarked, depending on whether the file has been migrated).

In Step 322, a determination is made about whether the migration attribute in the directory entry for the file is marked (i.e., has the file been migrated). If the migration attribute is marked, then the file has not been migrated and the process proceeds to Step 324. If the migration attribute is un-marked, then the file has been migrated and the process proceeds to Step 330. In one embodiment of the invention, a file is considered migrated when the file data for the file has been obtained from the source FS. In Step 324, the FS operation request is processed. Step 324 is described with respect to FIG. 3B. In one embodiment of the invention, the file data is obtained using the path stored in the extended attribute for the corresponding directory entry for the file.

Continuing with the discussion of FIG. 3A, optionally, in Step 326, the space map(s) are updated. In one embodiment of the invention, updating the space maps include: (i) updating remote range and/or adding an additional remote range in the in-memory space map to reflect the transfer of data (if any) in Step 324 and (ii) adding a local range to the on-disk space map to reflect the transfer of data (if any) in Step 324. Those skilled in the art will appreciate that Step 326 may not be performed if all the data in the requested in the FS operation request is already present in the target FS. Optionally, in Step 328, the migration attribute for the file is unmarked. In one embodiment of the invention, Step 328 is only performed when the entire file (and not just portions of the file) have been copied to the target FS. In Step 330, the FS operation request is processed using the target FS.

Referring to FIG. 3B, in Step 340, obtained the requested range of the file from the FS operation request. In one embodiment of the invention, the requested range corresponds to the portion of the file specified in the FS operation request. The request range may refer to multiple portions (contiguous or non-contiguous) of the file.

In Step 342, the space map for the file is obtained. In one embodiment of the invention the space map may be the in-memory space map. Alternatively, the space map may be the on-disk space map. In Step 344, the remote range(s) for the file is determined from the space map obtained in Step 342. In one embodiment of the invention, the remote range(s) corresponds to the portions of the file that exist in the source FS but not in the target FS.

In Step 346, a determination is made about whether there is any overlap between the requested range (determined in Step 340) and the remote range (determined in Step 344). In one embodiment of the invention, the overlap determine whether any portion of the requested range is not present on the target FS. If there is an overlap between the requested range and the remote range, then the process proceeds to Step 348; otherwise, the proceeds to the end of FIG. 3B (and returns to FIG. 3A, Step 326). In Step 348, the data corresponding for the overlap (as determined in Step 346) is obtained from the source FS. In Step 350, the data obtained in Step 348 is stored in the target FS.

In one embodiment of the invention, FIGS. 3A-3B shows a method for servicing synchronous FS operation requests (i.e., FS operation requests from clients). In one embodiment of the invention, the method shown in FIGS. 3A-3B may be performed (for example concurrently) by background processes in order to migrate directory entries from the source FS to the target FS. For example, one or more background processes may include functionality to traverse the source FS and migrate all un-migrated file encountered during the traversal in accordance with one or more embodiments discussed above. In one embodiment, the background processes may be associated with a lower processing priority than processes used to service synchronous FS operation requests.

In another embodiment of the invention, the method shown in FIGS. 3A-3B may be performed concurrently with a background migration process(es). In particular, the background process migrates each directory and/or file encountered (i.e., copies meta-data and data (if applicable) for the directory and/or file at the time it is encountered). In such cases, two separate migration processes are used to migrate the files and directories to from the source FS to the target FS, namely the method shown in FIGS. 3A-3B and the background process (es).

The following examples are provided to illustrate various aspects of the invention and are not intended to limit the scope of the invention.

Figure 4:
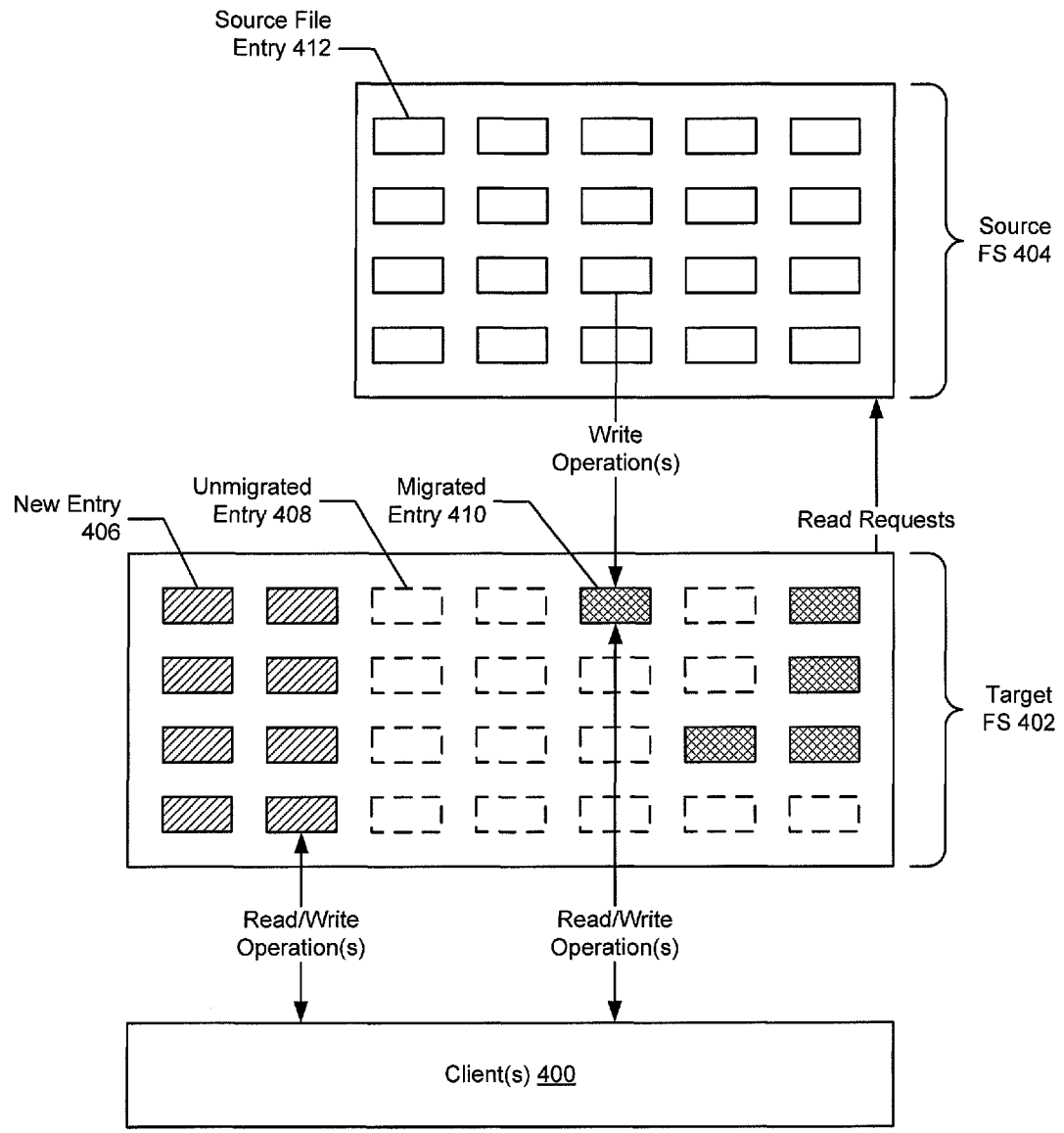
FIG. 4 shows an example system in accordance with one embodiment of the invention.

FIG. 4 shows an example system in accordance with one embodiment of the invention. More specifically, FIG. 4 shows the interaction between client(s) 400, the target FS (402), and the source FS (404).

In one embodiment of the invention, the client(s) (400) cease to send FS operation requests to the source FS (404) and instead re-direct (or re-issue) all FS operation requests to the target FS (402). The client(s) (400) are unaware that the target FS (402) may not (at the time of the FS operation request) include a copy of the file, which is the target of the FS operation request.

As shown in FIG. 4, the client(s) may perform read/write operations on new entries (406) (i.e., directory entries for files and, sub-directories, or directories that are initially created on the target FS (402) and, as such, were never present on the source FS (404)). Further, the clients may perform read/write operations on unmigrated directory entries (e.g., 408) and migrated directory entries (e.g., 410). With respect to unmigrated directory entries, the target FS (402) must perform the appropriate steps (see FIG. 3) in order to migrate the corresponding source directory entry (e.g., 412) from the source FS (404) to the target FS (402) prior to serving the FS operation request from the client(s) (400).

With respect to migrated directory entries, once the directory entries have been migrated, the client(s) (400) interact with the migrated directory entries in the same manner as the client(s) (400) interact with the new directory entries.

Figure 5A:
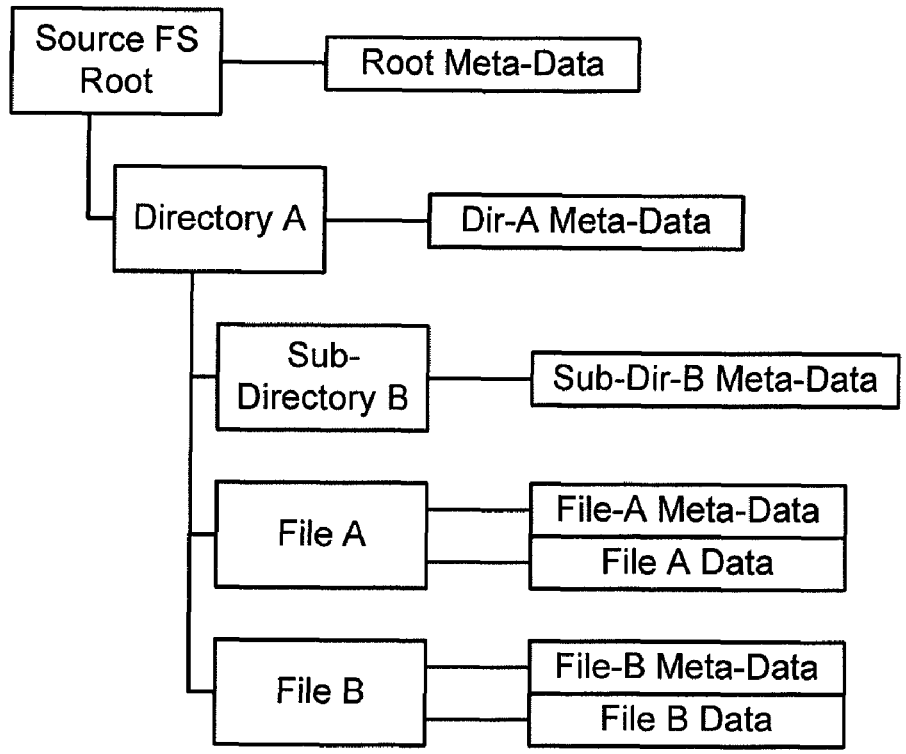
FIGS. 5A-5I show an example in accordance with one embodiment of the invention.

FIGS. 5A-5F show an example in accordance with one embodiment of the invention. More specifically, FIG. 5A shows a source FS and FIG. 5B-5F show an exemplary migration of the source FS to a target FS in accordance with one or more embodiments of the invention.

Referring to FIG. 5A, the source FS includes a source FS root (i.e., the entry point in to the source FS). The source FS further includes a directory entry for Directory A. The directory entry for Directory A further includes directories entries for Sub-Directory B, File A, and File B. Each of the source FS root, Directory A, and Sub-Directory B includes corresponding meta-data. In addition, each of the aforementioned files includes file meta-data and file data. While not shown, assume for purposes of this example that Sub-Directory B includes additional directory entries for additional files.

Figure 5B:
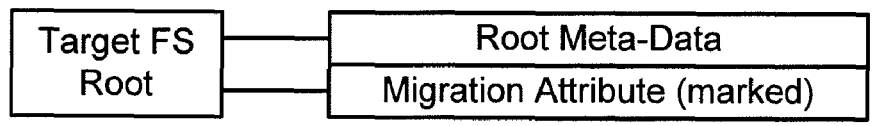

FIG. 5B shows the target FS after the steps in FIG. 2 have been performed. Specifically, once the Steps in FIG. 2 have been performed, the target FS includes a target FS root, which is associated with root meta-data as well as a migration attribute. As shown in FIG. 5B, the migration attribute is set as "marked", which indicates the target FS root has not been migrated.

Figure 5C:
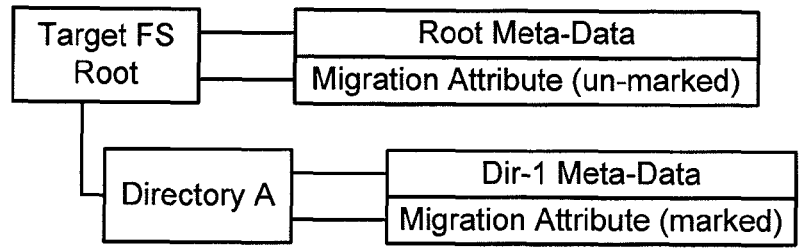

FIG. 5C shows the target FS after a read request for the target FS root is serviced by the target FS. In response to the request, Steps 302, 304, 306, 308, 310, 312, 314, 316, 318, and 330 are performed. The result of performing the aforementioned steps is the updating of the migration attribute associated with the target FS root to "un-marked", which indicates that the target FS root has been migrated. Further, a directory entry for Directory A is created in the target FS. The directory entry for Directory A is associated with corresponding meta-data (i.e., Dir-1-Meta-Data) obtained from the source FS, and with a migration attribute. As shown in FIG. 5C, the migration attribute is set as "marked", which indicates Directory A has not been migrated.

Figure 5D:
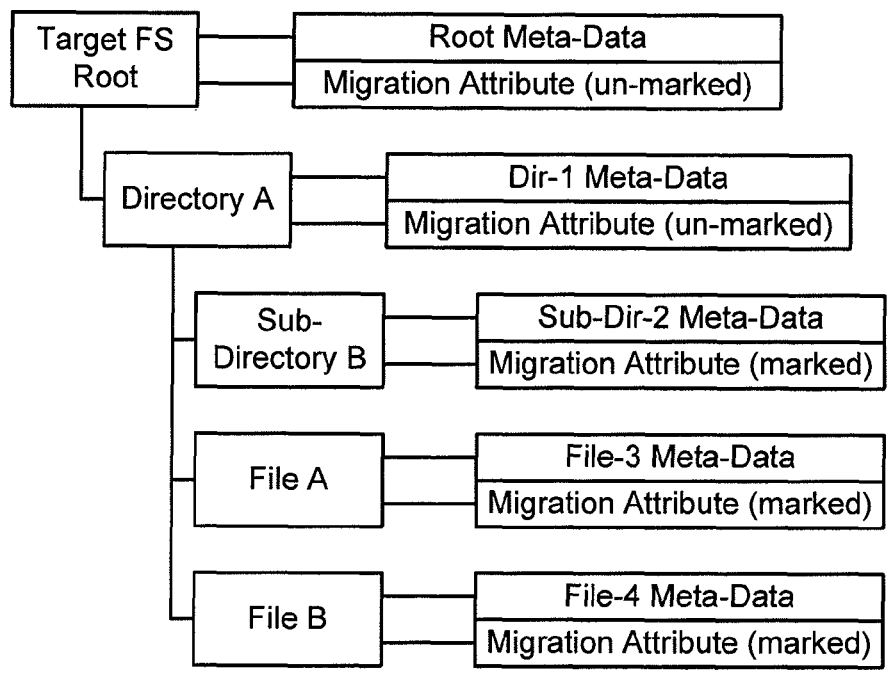
Figure 5D:
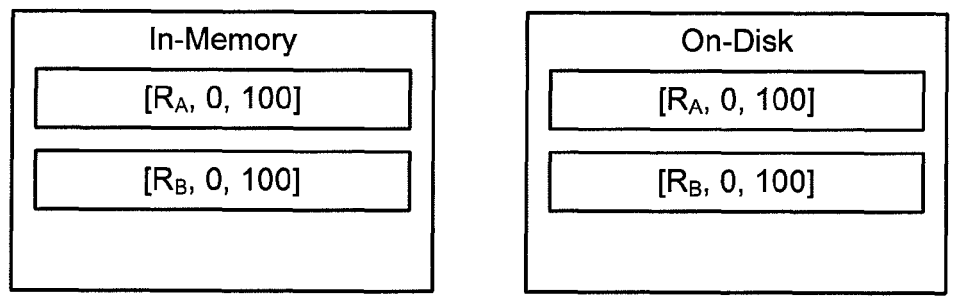

FIG. 5D shows the target FS after a read request for Directory A is serviced by the target FS. In response to the request, Steps 302, 304, 306, 308, 310, 312, 314, 316, 318, and 330 are performed. The result of performing the aforementioned steps is the updating of the migration attribute associated with Directory A to "un-marked", which indicates that Directory A has been migrated. Further, directory entries for Sub-Directory B, File A, and File B are created on the target FS. The directory entry for Sub-Directory B is associated with corresponding meta-data (i.e., Sub-Dir-2-Meta-Data) obtained from the source FS and with a migration attribute. As shown in FIG. 5D, the migration attribute is set as "marked", which indicates that Sub-Directory B has not been migrated. Further, the directory entries for File A and File B are associated with corresponding meta-data (i.e., File-3-Meta-Data and File-4-Meta-Data) obtained from the source FS, and with corresponding migration attributes. As shown in FIG. 5D, the migration attributes for Files A and B are set as "marked", which indicates Files A and B have not been migrated.

In addition, an in-memory and an on-disk space map for each of the files (i.e., File A and File B) is created. As discussed in FIG. 3A, the initial state of the space maps are the remote ranges of the files. More specifically, in this example, $R_A$ refers to remote range for file A and $R_B$ refers to the remote range for File B. Further, "0" denotes the beginning of the file range and "100" denotes the end of the file range.

Figure 5E:
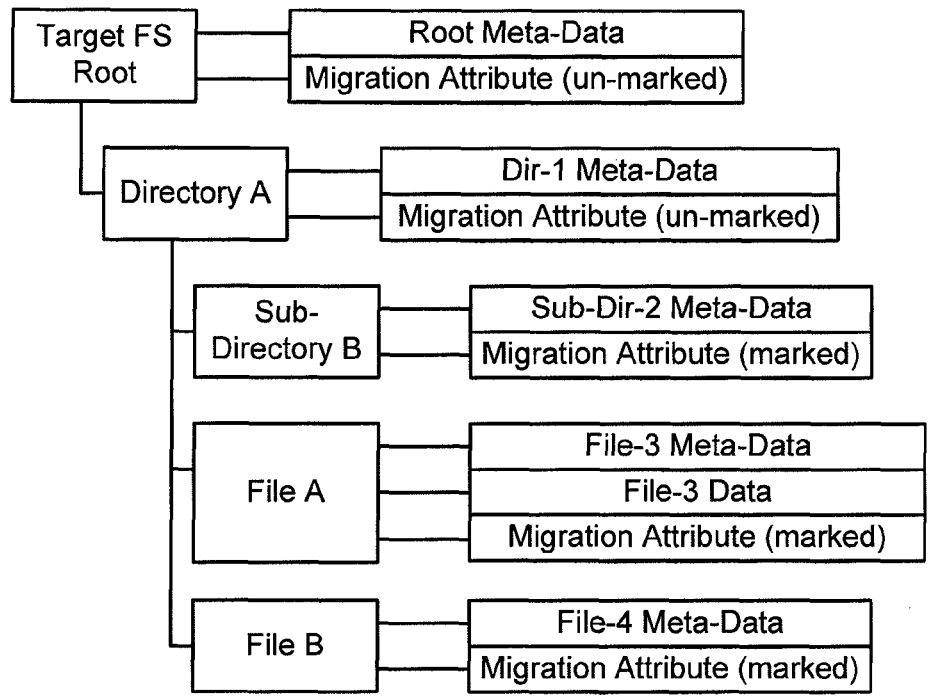
Figure 5E:
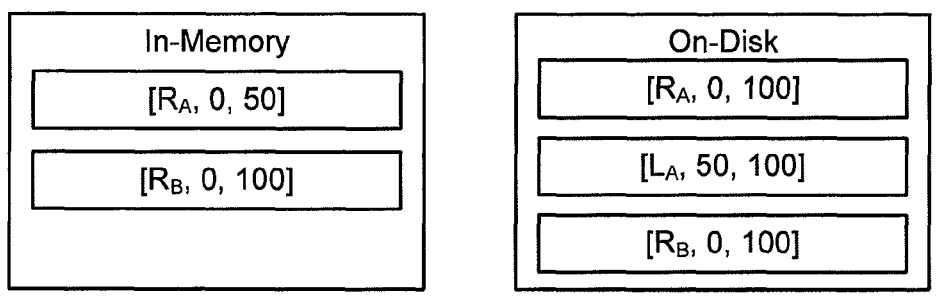

FIG. 5E shows the target FS after a read request for a portion of File A (i.e., 50-100) is serviced by the target FS. In response to the request, Steps 302, 304, 306, 320, 322, 324 (including steps in FIG. 3B), 326, 328, and 330 are performed. The result of performing the aforementioned steps is storage of portions of the file data for File A (i.e., File 3 Data) on the target FS. Because the entire file was not migrated, the migration attribute associated with File A remains designated as "marked". In addition, the in-memory space map for File A is updated as follows: $[R_A, 0, 50]$ and the on-disk memory space map is updated by appending the following local range $[L_A, 50, 100]$, which corresponds to the portions of File A copied to the target FS. Those skilled in the art will appreciate that $[R_A, 0, 50]$ is equivalent to applying $[L_A, 50, 100]$ to $[R_A, 0, 100]$.

Figure 5F:
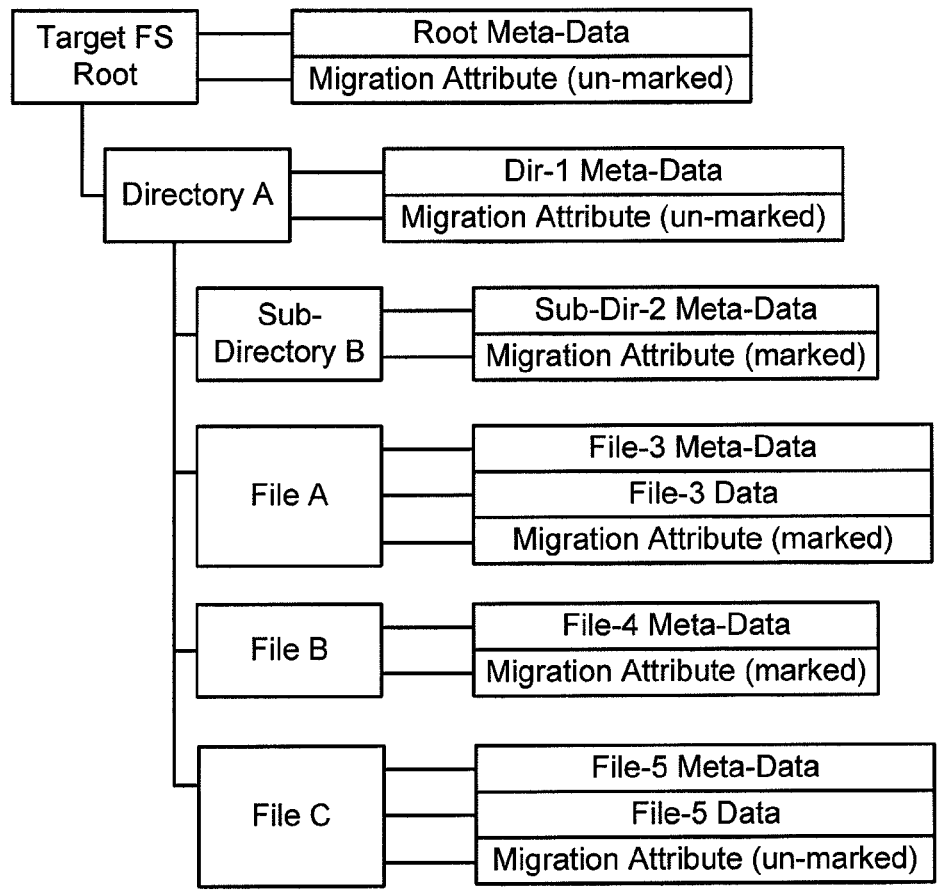
Figure 5F:
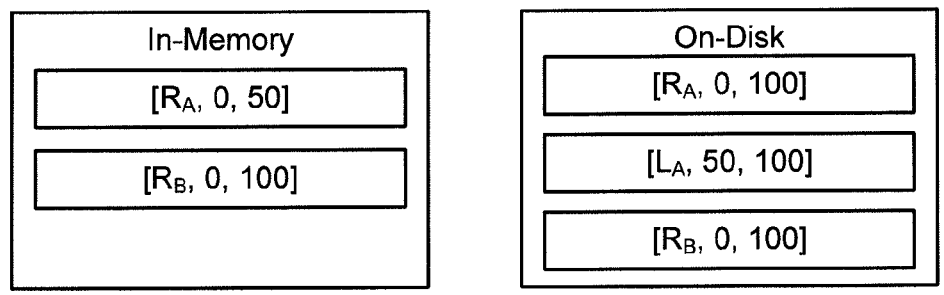

FIG. 5F shows the target FS after a full write request for File C is serviced by the target FS. In response to the request, Steps 302 and 330 are performed. The result of performing the aforementioned steps is creation of a directory entry for File C, which includes meta-data, file data, and a migration attribute. The migration attribute for File C is set as un-marked, which indicates that File C has been migrated. Those skilled in the art will appreciate that the state of the target FS shown in FIG. 5F, may be the result of writing a new directory entry to the target FS (i.e., File C was not previously present on the source FS) or the result of a partial write request (i.e., File C was migrated from the source FS and then a portion of the file data (or meta-data) associated with File C was overwritten).

Figure 5G:
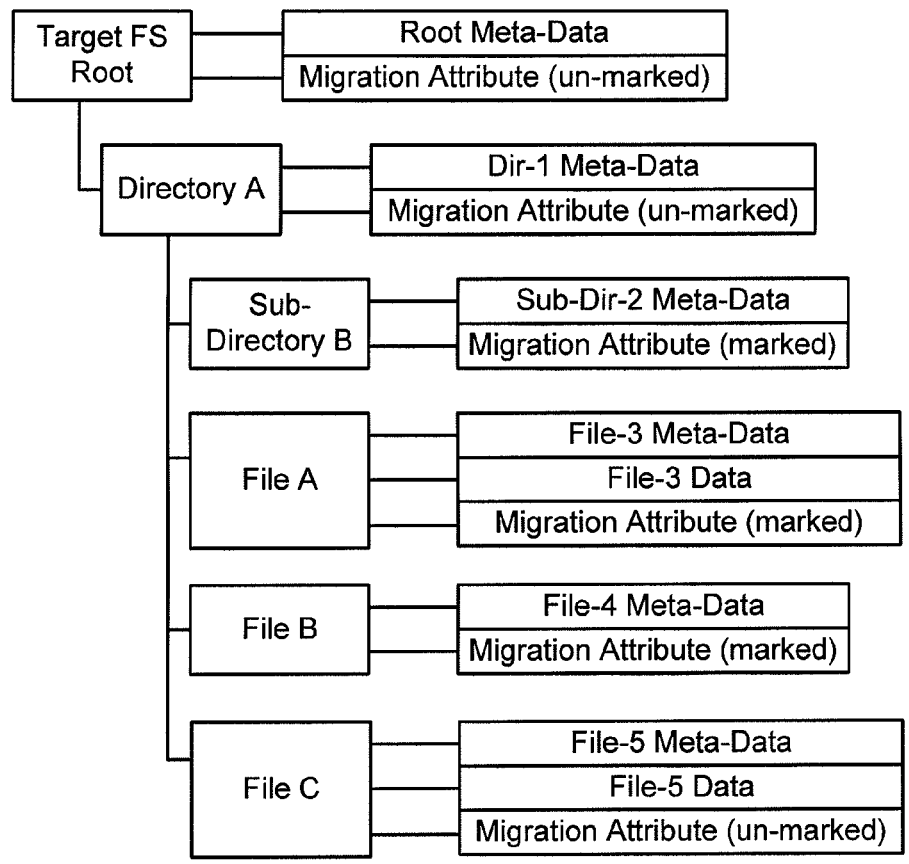
Figure 5G:
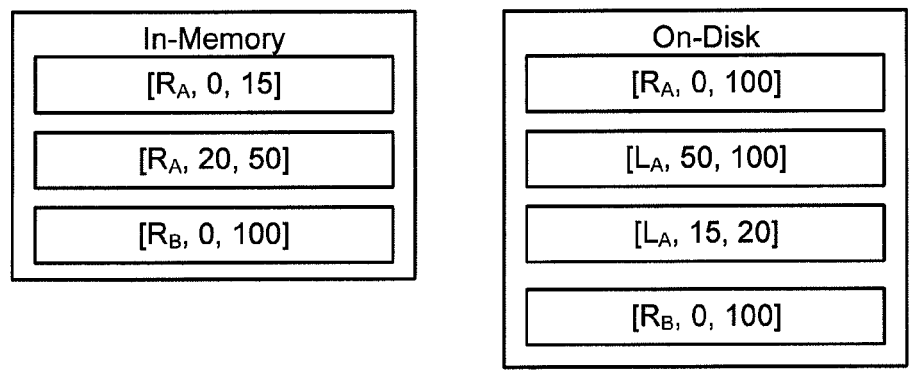

FIG. 5G shows the target FS after a read request for another portion of File A (i.e., 15-20) is serviced by the target FS, wherein the portion of the file specified in the read request is not present on the target FS. In response to the request, Steps 302, 304, 306, 320, 322, 324 (including steps in FIG. 3B), 326, 328, and 330 are performed. The result of performing the aforementioned steps is storage of additional portions of the file data for File A (i.e., File 3 Data) on the target FS. Because the entire file was not migrated (or rather, has not been migrated), the migration attribute associated with File A remains designated as "marked". In addition, the in-memory space map for File A is updated to include the following two remote ranges: $[R_A, 0, 15], [R_A, 20, 50]$. Further, the on-disk memory space map is updated by appending the following local range $[L_A, 15, 20]$, which corresponds to the portions of File A copied to the target FS.

Figure 5H:
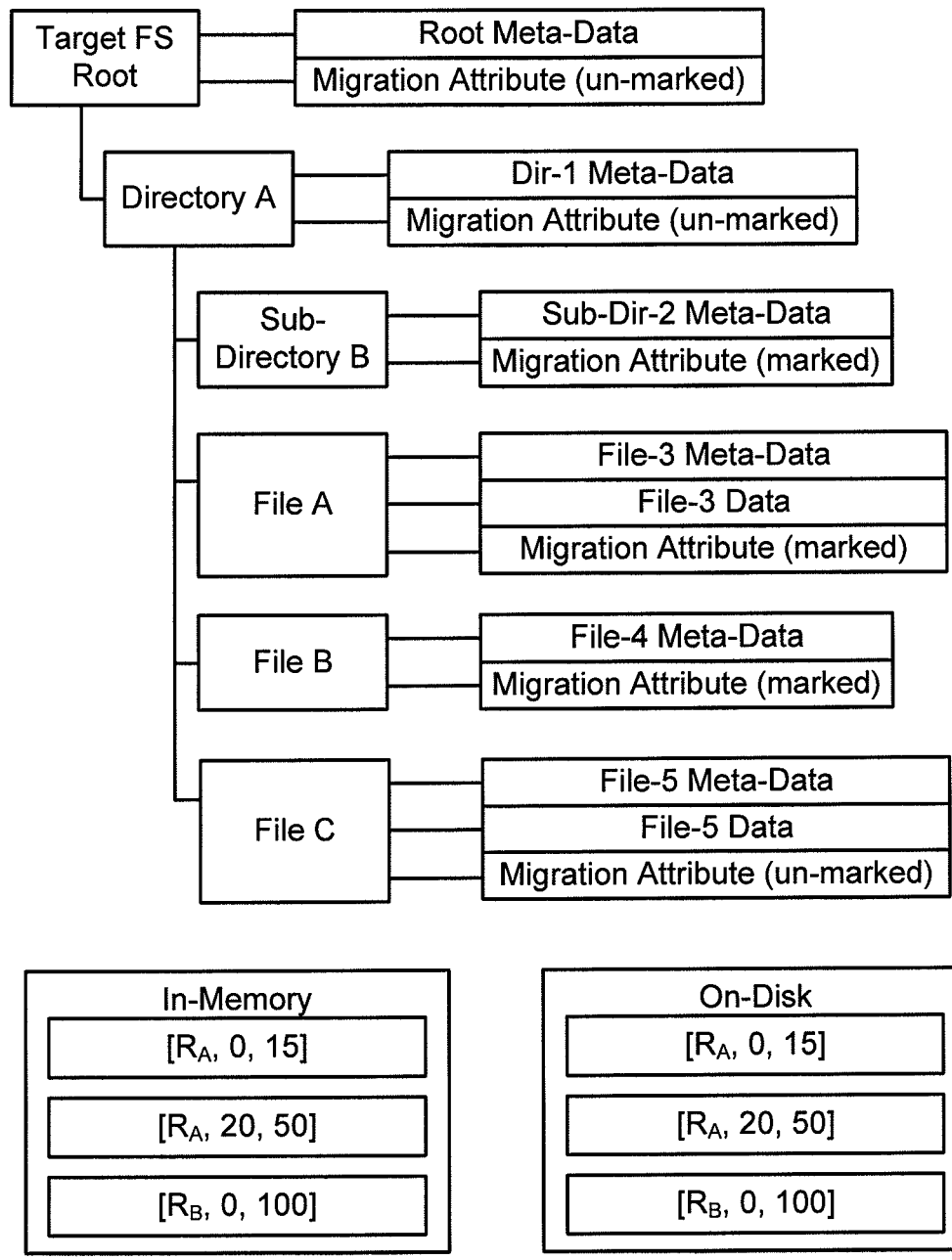

FIG. 5H shows the target FS after the on-disk space map for File A has been compressed. In this example, the resulting on-disk space map for File A is generated by applying $[L_A, 50, 100], [L_A, 15, 20]$ to $[R_A, 0, 100]$. The compression of the on-disk space map may be performed using the compression mechanism discussed above.

In one embodiment of the invention, the compression of the on-disk space map may occur frequently or infrequently depending on the implementation of the invention. In one embodiment of the invention, the on-disk space map may be compressed once the number of local ranges in the space map exceeds a pre-defined number. In another embodiment of the invention, the space map be implemented using a time-based mechanism, which initiates compression of the on-disk space map at set time intervals.

Figure 5I:
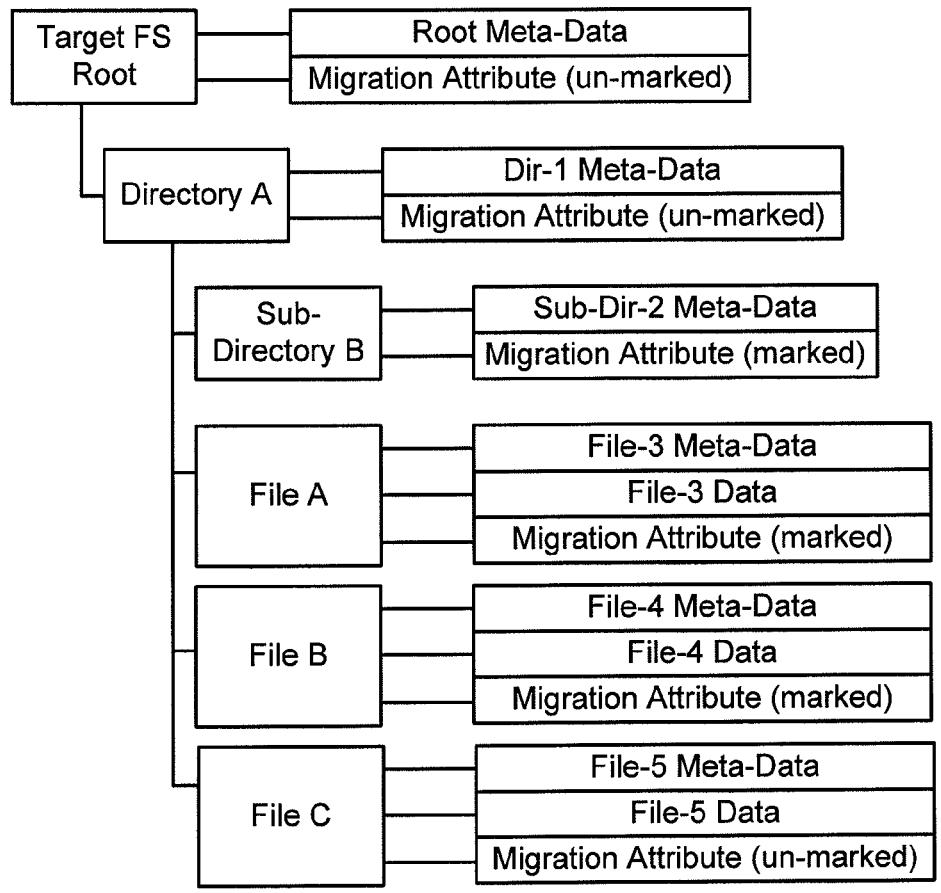
Figure 5I:
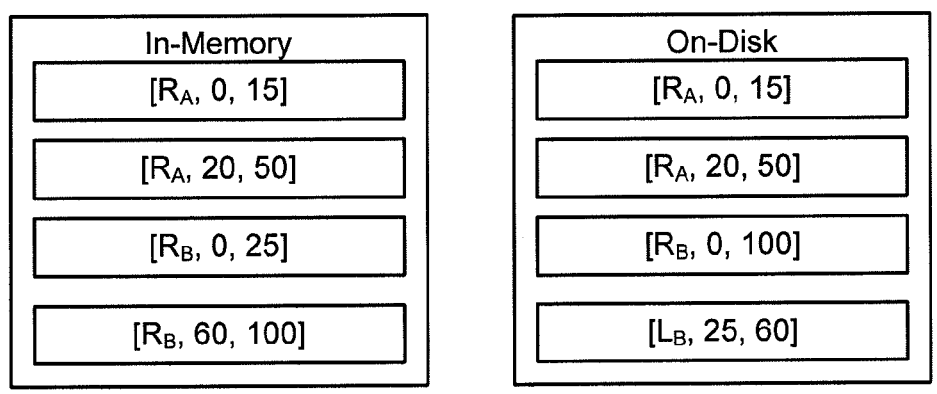
Figure 6:
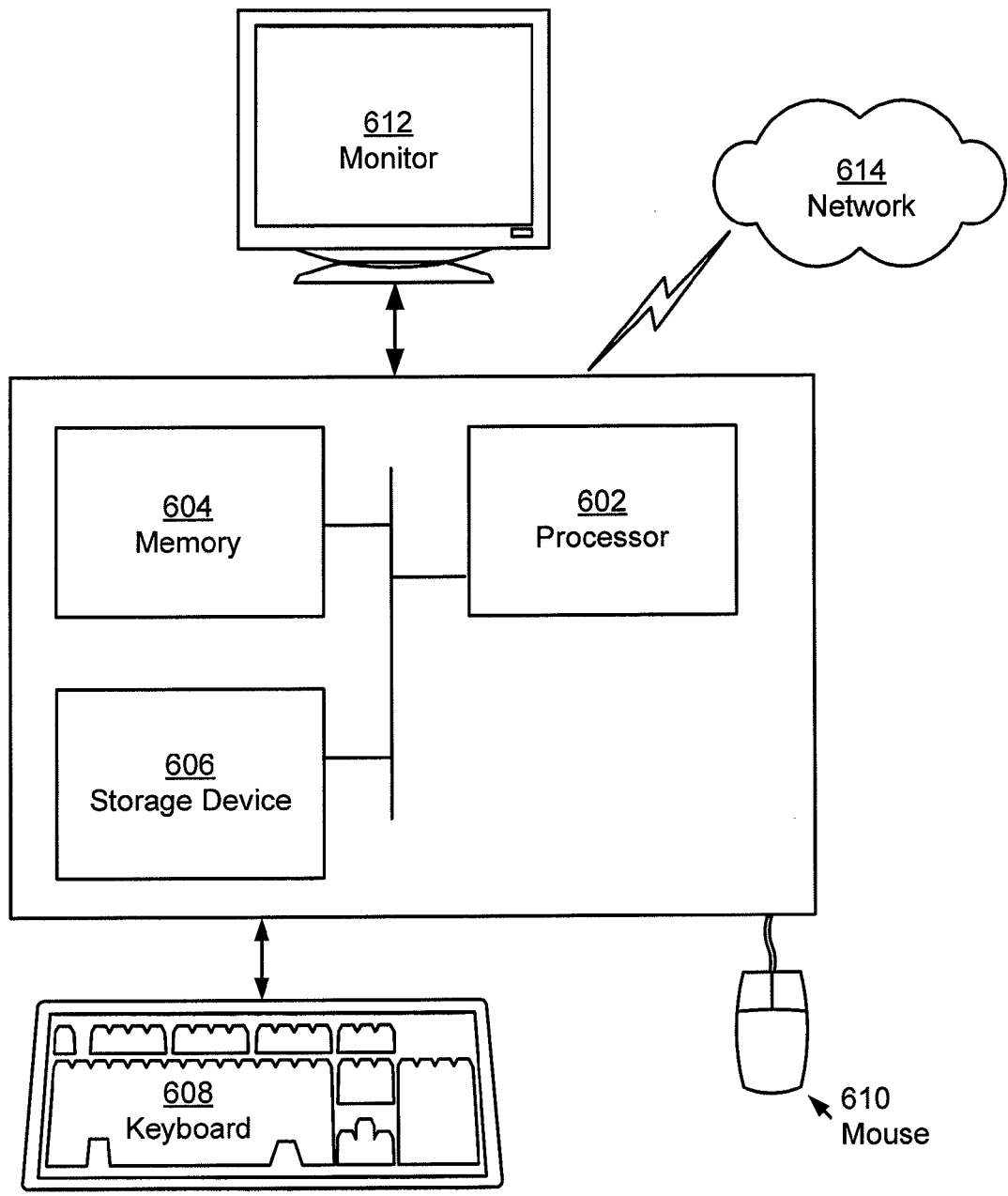
FIG. 6 shows a computer system in accordance with one embodiment of the invention.

FIG. 5I shows the target FS after a write request for a portion of File B (i.e., 25-60) is serviced by the target FS. In response to the request, Steps 302 and 330 are performed. The result of performing the aforementioned steps is storage of additional portions of the file data for File B (i.e., File 4 Data) on the target FS. Because the entire file was not migrated (or rather, has not been migrated), the migration attribute associated with File B remains designated as "marked". In addition, the in-memory space map for File B is updated to include the following two remote ranges: $[R_B, 0, 25], [R_B, 60, 100]$. Further, the on-disk memory space map is updated by appending the following local range $[L_B, 25, 60]$, which corresponds to the portions of File B written to the target FS.

Embodiments of the invention may be implemented on virtually any type of computer regardless of the platform being used. For example, as shown in FIG. 4, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (602) is hardware. For example, the processor may be an integrated circuit. The computer system (600) may also include input means, such as a keyboard (608), a mouse (610), or a microphone (not shown).

Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., storage devices, operating system, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Instructions to perform embodiments of the invention may be stored on a computer readable storage medium such as a compact disc (CD), a diskette, a tape, physical memory, or any other tangible computer readable storage medium that includes functionality to store instructions to perform embodiments of the invention. In one embodiment of the invention the instructions, when executed by a processor(s), are configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable storage medium comprising software instructions, which when executed by a processor, perform a method, the method comprising:
    receiving, from a client, a first file system (FS) operation request for a target FS;
    making a first determination that migration for a source FS is not complete;
    making a second determination that the first FS operation request specifies a directory and that a directory level attribute for the directory on the target FS specifies that the directory on the target FS is un-migrated;
    in response to the first and second determination:
        obtaining, from the source FS, meta-data for content in the directory;
        creating, using the meta-data for content in the directory, a directory entry for a file in the directory on the target FS, wherein the directory entry for the file is associated with a file level attribute that specifies the file is un-migrated;
        creating an on-disk space map for the file;
        creating an in-memory space map for the file;
        servicing, after creating the on-disk space map and the in-memory space map, the first FS operation request using the target FS;
    receiving a second file system (FS) operation request for the target FS from the client;
    making a third determination that migration for the source FS is not complete;
    making a fourth determination that the second FS operation request specifies the file and that the file level attribute for the file on the target FS specifies that the file on the target FS is un-migrated;
    in response to the third and fourth determination:
        determining a requested range from the second FS operation request, wherein the requested range specifies one of a plurality of portions of the file and wherein the requested range is smaller than a size of the file;
        obtaining the in-memory space map for the file, wherein the in-memory space map comprises a remote range for the file, wherein the remote range specifies a plurality of portions of the file on the source FS that are not on the target FS;
        making a fifth determination that there is an overlap between the requested range and the remote range, wherein the overlap corresponds to the one of the plurality of portions of the file;
        in response to the fifth determination:
            obtaining file data for the one of the plurality of portions of the file from the source FS;
            populating the directory entry for the file on the target FS using the file data and
            servicing, after the populating, the second FS operation request using the target FS.

2. The computer readable storage medium of claim 1, the method further comprising:
    prior to receiving the first FS operation request for the target FS:
        disconnecting the client from the source FS;
        setting the source FS to read-only;
        creating the target FS;
        granting a target system comprising the target FS access to the source FS; and
        directing the client to issue the first FS operation request to the target FS.

3. The computer readable storage medium of claim 1, the method further comprising:
    updating, after the creating, the directory level attribute to indicate that the directory on the target FS is migrated.

4. The computer readable storage medium of claim 1, the method further comprising:
    updating the in-memory space map after servicing the second FS request to obtain a updated in-memory space map, wherein the updated in-memory space map comprises an updated remote range.

5. The computer readable storage medium of claim 4, the method further comprising:
    updating the on-disk space map after servicing the second FS request to obtain an updated on-disk space map, wherein the updated on-disk space map comprises the remote range and a local range, wherein the local range corresponds to the one of the plurality of portions of the file.

6. The computer readable storage medium of claim 5, the method further comprising:
compressing the on-disk space map, wherein compressing the on-disk space map comprises:
updating the remote range with the local range to obtain the update remote range, and removing the local range from the on-disk space map.

7. The computer readable storage medium of claim 1, the method further comprising:
receiving a third file system (FS) operation request for the target FS from the client;
making a sixth determination that migration for the source FS is not complete;
making a seventh determination that the second FS operation request specifies the file and that the file level attribute for the file on the target FS specifies that the file on the target FS is migrated;
in response to the sixth and seventh determination:
servicing the third FS operation request using target FS.

8. The computer readable storage medium of claim 1, wherein the second FS operation request is a read request.

9. The computer readable storage medium of claim 1, wherein the file level attribute is implemented as an extended attribute of the target FS.

10. The computer readable storage medium of claim 1, wherein the on-disk space map is implemented as a log.

11. A computer system, comprising:
a processor; and
a virtual file system layer (VFS) operatively connected to a source file system (FS) and a target FS,
wherein the VFS, when executed by the processor, performs a method, the method comprising:
receiving, from a client, a first file system (FS) operation request for a target FS;
making a first determination that migration for a source FS is not complete;
making a second determination that the first FS operation request specifies a directory and that a directory level attribute for the directory on the target FS specifies that the directory on the target FS is un-migrated;
in response to the first and second determination:
obtaining, from the source FS, meta-data for content in the directory;
creating, using the meta-data for content in the directory, a directory entry for a file in the directory on the target FS, wherein the directory entry for the file is associated with a file level attribute that specifies the file is un-migrated;
creating an on-disk space map for the file;
creating an in-memory space map for the file;
servicing, after creating the on-disk space map and the in-memory space map, the first FS operation request using the target FS;
receiving a second file system (FS) operation request for the target FS from the client;
making a third determination that migration for the source FS is not complete;
making a fourth determination that the second FS operation request specifies the file and that the file level attribute for the file on the target FS specifies that the file on the target FS is un-migrated;
in response to the third and fourth determination:
determining a requested range from the second FS operation request, wherein the requested range specifies one of a plurality of portions of the file and wherein the requested range is smaller than a size of the file;
obtaining the in-memory space map for the file, wherein the in-memory space map comprises a remote range for the file, wherein the remote range specifies a plurality of portions of the file on the source FS that are not on the target FS;
making a fifth determination that there is an overlap between the requested range and the remote range, wherein the overlap corresponds to the one of the plurality of portions of the file;
in response to the fifth determination:
obtaining file data for the one of the plurality of portions of the file from the source FS;
populating the directory entry for the file on the target FS using the file data and
servicing, after the populating, the second FS operation request the using target FS.

12. The computer system of claim 11, wherein the method further comprises:
prior to receiving the first FS operation request for the target FS:
disconnecting the client from the source FS;
setting the source FS to read-only;
creating the target FS;
granting a target system comprising the target FS access to the source FS; and
directing the client to issue the first FS operation request to the target FS.

13. The computer system of claim 11, the method further comprising:
updating the in-memory space map after servicing the second FS request to obtain an updated in-memory space map, wherein the updated in-memory space map comprises an updated remote range.

14. The computer system of claim 13, the method further comprising:
updating the on-disk space map after servicing the second FS request to obtain an updated on-disk space map, wherein the updated on-disk space map comprises the remote range and a local range, wherein the local range corresponds to the one of the plurality of portions of the file.

15. The computer system of claim 14, the method further comprising:
compressing the on-disk space map, wherein compressing the on-disk space map comprises:
updating the remote range with the local range to obtain the update remote range, and removing the local range from the on-disk space map.

16. The computer readable medium of claim 11, wherein the in-memory space map is implemented an AVL tree.

* * * * *

UNITED STATES PATENT AND TRADEMARK OFFICE
CERTIFICATE OF CORRECTION

PATENT NO. : 8,260,798 B2  
APPLICATION NO. : 12/820723  
DATED : September 4, 2012  
INVENTOR(S) : Schrock et al.

Page 1 of 1

It is certified that error appears in the above-identified patent and that said Letters Patent is hereby corrected as shown below:

In the Specifications:

In column 2, line 33, delete "show" and insert -- shows --, therefor.

In column 4, line 15, delete "thereof" and insert -- thereof. --, therefor.

In column 6, line 28, delete "ST 324-ST328)" and insert -- ST 324-ST 328) --, therefor.

In the Claims:

In column 12, line 40, in Claim 1, delete "data" and insert -- data; --, therefor.

In column 14, line 24, in Claim 11, delete "data" and insert -- data; --, therefor.

In column 14, line 59, in Claim 16, delete "computer readable medium" and insert -- computer system; --, therefor.

Signed and Sealed this  
Twenty-third Day of April, 2013

Teresa Stanek Rea  
*Acting Director of the United States Patent and Trademark Office*